United States Patent [19]

Miyake et al.

[11] Patent Number: 5,256,481
[45] Date of Patent: Oct. 26, 1993

[54] MAGNETIC RECORDING MEDIUM

[75] Inventors: Akira Miyake, Kyoto; Mikio Kishimoto; Masaya Funahashi, both of Osaka; Teruhisa Miyata; Hitoshi Nagatani, both of Kyoto, all of Japan

[73] Assignee: Hitachi Maxell, Ltd., Ibaraki, Japan

[21] Appl. No.: 740,877

[22] Filed: Jul. 31, 1991

Related U.S. Application Data

[63] Continuation of Ser. No. 145,927, Jan. 20, 1988, abandoned, which is a continuation of Ser. No. 28,652, Mar. 20, 1987, abandoned.

[30] Foreign Application Priority Data

Mar. 20, 1986 [JP] Japan .................................. 61-63173

[51] Int. Cl.$^5$ ............................................. H01F 10/02
[52] U.S. Cl. ..................................... 428/336; 427/131; 428/693; 428/694 R; 428/900; 428/694 TS
[58] Field of Search .............. 427/131, 132, 129, 130, 427/48; 428/900, 693, 694, 695, 336

[56] References Cited

U.S. PATENT DOCUMENTS

| | | | |
|---|---|---|---|
| 3,959,553 | 5/1976 | Hartmann et al. | 427/131 X |
| 4,275,113 | 6/1981 | Saito et al. | 427/131 X |
| 4,487,802 | 12/1984 | Miyoshi et al. | 427/131 X |
| 4,540,618 | 9/1985 | Suzuki et al. | 428/195 X |
| 4,671,995 | 6/1987 | Sekiya et al. | 427/131 X |
| 4,702,959 | 10/1987 | Shimozawa et al. | 428/323 |

Primary Examiner—Bernard Pianalto
Attorney, Agent, or Firm—Birch, Stewart, Kolasch & Birch

[57] ABSTRACT

A magnetic recording medium suitable for high density recording having improved erasing characteristics is produced by a method comprising the steps of forming an under coat layer containing an electrically conductive material on at least one surface of a substrate, applying a magnetic paint containing hexagonal system ferrite magnetic powder on the under coat layer and drying the applied magnetic paint to form a magnetic layer having a thickness of not larger than 0.7 μm.

7 Claims, No Drawings

MAGNETIC RECORDING MEDIUM

This application is a continuation of application Ser. No. 07/145,927 filed on Jan. 20, 1988, which is a continuation of application Ser. No. 07/028,652, filed on Mar. 20, 1987, both now abandoned.

BACKGROUND OF THE INVENTION

1. Field of the Invention

The present invention relates to a magnetic recording and method of producing some medium suitable for high density recording. More particularly, it relates to a magnetic recording medium with improved erasing characteristics and productivity which comprises a magnetic layer having a thickness of not larger than 0.7 μm.

2. Description of the Prior Arts

Conventionally, magnetic properties of a magnetic recording medium have been improved, for example, by orientating longer axis of acicular particles of magnetic powder in a direction along a longitudinal direction of the magnetic layer. However, in a magnetic recording medium utilizing magnetic components in the longitudinal direction of the magnetic layer, as the magnetic recording density increases, the strength of a demagnetic field in the magnetic layer also increases so that a decrease and rotation of the residual magnetization are caused, which makes it difficult to detect recorded signals. Therefore, the recording density has its own limit.

In a perpendicular magnetic recording system which utilizes a magnetic component perpendicular to the plane of the magnetic layer, the strength of the demagnetizing field decreases as the recording density increases, so that such recording system is recognized to be suitable for high density recording. For example, in the perpendicular magnetic recording system, hexagonal system ferrite powder, each particle of which has a platelet shape and magnetic easy axis in a direction perpendicular to said platelet plane, is used and contained in the magnetic layer so that planes of the platelets of the magnetic powder are orientated in parallel with the plane of the magnetic layer (cf. Japanese Patent Kokai Publication (unexamined) No. 209928/1985).

When a conventional magnetic head is used in combination with the perpendicular magnetic recording utilizing the magnetic component perpendicular to the plane of the magnetic layer, a perpendicular component of magnetization has a short range so that the erasing characteristics are deteriorated. To overcome such a drawback, it is well known to make the magnetic layer as thin as possible. However, the magnetic paint generally has poor electric conductivity and suffers from a large shearing stress when applied with a small thickness, whereby sores develop on the dried magnetic layer. Therefore, it is difficult to form a magnetic layer having a thickness as thin as possible over a long distance. This is the case, particularly when the hexagonal system ferrite magnetic powder is used, and since each particle of the powder has a smaller volume and poorer electric conductivity than conventionally used acicular magnetic powder, it is very difficult to form a magnetic layer having a thickness as thin as possible over a long distance.

SUMMARY OF THE INVENTION

One object of the present invention is to provide a method for producing a magnetic recording medium comprising a magnetic layer having a thickness as thin as possible.

Another object of the present invention is to provide a method for producing a magnetic recording medium in which electric resistance during application of a magnetic paint on a substrate is reduced as much as possible.

Further object of the present invention is to provide a method for producing a magnetic recording medium by which a magnetic layer containing hexagonal system ferrite magnetic powder and having a thickness of not larger than 0.7 μm which can be uniformly formed over a long distance.

A yet another object of the present invention is to provide a method for producing a magnetic recording medium which has improved erasing characteristics and is suitable for high density recording.

These and other object of the present invention are achieved by a method for producing a magnetic recording medium which comprising steps of forming an under coat layer containing an electrically conductive material on at least one surface of a substrate, applying a magnetic paint containing hexagonal system ferrite magnetic powder on the under coat layer and drying the applied magnetic paint to form a magnetic layer having a thickness of not larger than 0.7 μm.

DETAILED DESCRIPTION OF THE INVENTION

According to the present invention, the under coat layer having good electric conductivity is formed between the substrate and the magnetic layer. When the under coat layer does not have sufficient electric conductivity, the electric resistance during application of the magnetic paint is not effectively reduced so that the magnetic paint is not smoothly and uniformly applied on the substrate. Therefore, the magnetic layer having a uniform thickness of not larger than 0.7 μm is not formed over a long distance of the substrate.

The under coat layer is formed by applying an under coat paint containing the electrically conductive material together with a binder resin, an organic solvent and other suitable additives on the surface of the substrate and drying it.

As the electrically conductive material, carbon black or electrically conductive metal powder such as copper powder and silver powder is preferably used. Preferably, a weight ratio of the electrically conductive material to a weight of the binder resin in the under coat layer is in a range from 85:15 to 10:90. When the content of the electrically conductive material is too small, the surface resistance of the substrate is not sufficiently reduced. When it is too large, adhesivity of the under coat layer to the substrate is decreased so that durability of the magnetic recording medium is deteriorated.

Preferably, the under coat layer has surface resistivity of $1 \times 10^8$ Ω or less. When the surface resistivity is larger than $1 \times 10^8$ Ω, the electric resistance during application of the magnetic paint is not sufficiently low so that the magnetic paint is not smoothly and uniformly applied on the substrate in a very small thickness over a long distance. The under coat layer has preferably a thickness of 0.1 μm or larger but not larger than 3.0 μm. When the thickness of the under coat layer is smaller than 0.1 μm, the electric resistance is not effectively reduced.

The binder resin and the organic paint used for preparing the under coat paint may be the same those used in the below described preparation a magnetic paint.

Since the presence of the under coat layer having good electric conductivity reduces the surface resistivity of the substrate, the magnetic paint containing the hexagonal system ferrite magnetic powder can be uniformly applied on the substrate in a thickness of not larger than 0.7 μm over a long distance of the substrate and the formed magnetic layer has good surface smoothness and stability. Thereby, the magnetic recording medium has improved erasing characteristics and is suitable for high density recording.

The magnetic layer may be formed by a per se conventional method. For example, the hexagonal system ferrite powder is mixed with and dispersed in a binder resin, an organic solvent and other conventional additives to prepare a magnetic paint. Then, the paint is applied on the under coat layer formed on the substrate by a conventional coating method, for example, by means of a roll coater and dried to form a magnetic layer having a thickness of not larger than 0.7 μm. If necessary, the coated magnetic layer is calendered.

Specific examples of the hexagonal system ferrite magnetic powder are barium ferrite magnetic powder, strontium ferrite magnetic powder, lead ferrite magnetic powder, calcium ferrite magnetic powder and the like. In such ferrite magnetic powder, a part of iron atoms may be replaced with other metal atom such as cobalt, titanium, zinc, zirconium, nickel, manganese, niobium and indium. A platelet of the hexagonal system ferrite magnetic powder has a size of 0.05 to 0.2 μm. Preferably, the hexagonal system ferrite magnetic powder has saturation magnetization of 40 to 70 emu/g and coercive force of 300 to 1,500 Oe.

When the magnetic paint contains an aliphatic acid ester, fluidity of the paint is increased and application of the paint over a long distance is facilitated. Preferred examples of the aliphatic acid ester are oleyl oleate, 2-ethylhexyl oleate, butyl stearate, octyl myristate, monoglyceride stearate, monoglyceride palmitate, monoglyceride oleate, pentaerythritol tetrastearate and the like as well as mixtures thereof. The amount of the aliphatic acid ester is from 0.1 to 20% by weight based on the weight of the hexagonal system ferrite magnetic powder. When the amount of the ester is less than 0.1% by weight, the fluidity of the magnetic paint and in turn productivity and the surface smoothness of the magnetic layer are not satisfactorily improved. When it is larger than 20% by weight, adhesivity of the magnetic layer is deteriorated.

The binder resin may be any of the conventional binder resins and includes vinyl chloride-vinyl acetate copolymers, polyvinyl butyral resins, cellulose type resins, polyurethane resins, polyester resins, epoxy resins, polyether resins, isocyanate compounds, radiation curable resins and the like.

The organic solvent is also any of the conventional organic solvents and includes acetone, methyl isobutyl ketone, methyl ethyl ketone, cyclohexanone, toluene, ethyl acetate, tetrahydrofuran, dimethyl formamide and mixtures thereof.

Examples of other additives are a dispersant, an abrasive and an antistatic agent.

The magnetic recording medium according to the present invention includes various forms such as a magnetic tape having a magnetic layer on one surface of the plastic tape substrate, a magnetic disc having magnetic layers on both surfaces of the disc substrate, and a magnetic drum.

The present invention will be hereinafter explained further in detail by following examples, wherein parts are by weight.

EXAMPLES 1-7

Following components were compounded in a ball mill for 72 hours to prepare an under coat paint:

| Component | Parts |
| --- | --- |
| Carbon black | 100 |
| Vinyl chloride-vinyl acetate-vinyl alcohol copolymer | 50 |
| Polyurethane resin | 30 |
| Isocyanate compound | 20 |
| Cyclohexanone | 500 |
| Toluene | 500 |

The under coat resin was coated on each surface of a substrate made of a polyethylene terephthalate film having thickness of 75 μm and dried. After being calendered, the dried paint was cured at 60° C. for 16 hours to form an under coat layer having a thickness of 1.0 μm.

A magnetic paint containing following components was prepared by compounding them in a ball mill for 72 hours:

| Component | Parts |
| --- | --- |
| Barium ferrite magnetic powder (A part of iron atom being replaced with cobalt and titanium ions. Platelet diameter: 0.06 μm, thickness: 0.012 μm, coercive force: 550 Oe. saturation magnetization: 54 emu/g, specific surface area by th BET method: 52 m²/g) | 100 |
| Vinyl chloride-vinyl acetate-vinyl alcohol copolymer | 12.5 |
| Polyurethane resin | 7.5 |
| Isocyanate compound | 5 |
| Alumina | 20 |
| Oleyl oleate | 10 |
| Cyclohexanone | 185 |
| Toluene | 185 |

The magnetic paint was coated on each of the under coat layers formed on the substrate in such an amount that, after drying, a magnetic layer had a thickness as shown in Table, and dried to form a magnetic layer.

Then, vertically oriented magnetic field with various strength as shown in Table was applied to the magnetic layer to orient magnetic filed. Thereafter, the magnetic layer was calendered.

The film with the under coat layers and the magnetic layers on both surface was blanked to produce a magnetic disc.

EXAMPLE 8

In the same manner as in Example 2 but using no oleyl oleate and increasing the thickness of the magnetic layer from 0.45 μm to 0.65 μm, a magnetic disc was produced.

EXAMPLE 9

In the same manner as in Example 8 but reducing the thickness of the magnetic layer from 0.65 μm to 0.45 μm, a magnetic disc was produced.

COMPARATIVE EXAMPLE 1

According to the manner in Example 1, the magnetic paint was intended to be coated on the substrate having no under coat layer with a thickness of 0.45 or 0.65 μm but it cannot be coated over a sufficiently long distance.

COMPARATIVE EXAMPLE 2

In the same manner as in Example 2 but forming no under coat layer and increasing the thickness of the magnetic layer from 0.45 μm to 0.82 μm, a magnetic disc was produced.

COMPARATIVE EXAMPLE 3

In the same manner as in Example 1 but forming no under coat layer, using cobalt-coated γ-Fe₂O₃ magnetic powder (major axis: 0.4 μm, axis ratio: 10, coercive force: 550 Oe, saturation magnetization: 78 emu/g, specific surface area by the BET method: 20 m²/g) in place of the barium ferrite magnetic powder in which a part of the iron atoms are replaced with cobalt and titanium ions, applying the vertically oriented magnetic field in strength of 3,000 Oe and increasing the thickness of the magnetic layer from 0.44 μm to 0.80 μm, a magnetic disc was produced.

COMPARATIVE EXAMPLE 4

In the same manner as in Example 1 but using barium ferrite magnetic powder in which a part of iron atoms are replaced with cobalt irons (platelet diameter: 0.06 μm, thickness: 0.012 μm, coercive force: 550 Oe, saturation magnetization: 54 emu/g, specific surface area by the BET method: 52 m²/g) in place of the barium ferrite magnetic powder in which a part of the iron atoms are replaced with cobalt and titanium ions and applying the vertically oriented magnetic field in strength of 3,000 Oe, a magnetic disc was produced.

COMPARATIVE EXAMPLE 5

In the same manner as in Comparative Example 4 but increasing the thickness of the magnetic layer from 0.44 μm to 0.66 μm, a magnetic disc was produced.

COMPARATIVE EXAMPLE 6

In the same manner as in Comparative Example 3 but reducing the thickness of the magnetic layer from 0.80 μm to 0.45 μm, a magnetic disc was produced.

Each of the magnetic discs produced in Examlles and Comparative Examples was examined on its squareness ration in a direction perpendicular to a plane of the disc, S/N ratio and overwrite characteristics.

S/N ratio was determined by measuring output at 40 kfci and a noise level at 50 kfci when recording a signal of 40 kfci by using a ferrite magnetic head having a gap of 0.3 μm. The overwrite characteristics were determined by measuring a ratio of residual output at 20 kfci to output at 40 kfci when recording a signal of 40 kfci to overwrite a signal of 20 kfci by using a ferrite magnetic head having a gap of 0.3 μm.

The results are shown in Table.

TABLE

| Example No. | Under coat layer | Thickness of magnetic layer (μm) | Vertically oriented magnetic field (Oe) | Squareness ratio | S/N (dB) | Overwrite characteristics (dB) |
| --- | --- | --- | --- | --- | --- | --- |
| 1 | Yes | 0.44 | 0 | 0.55 | +0.2 | −31.2 |
| 2 | Yes | 0.45 | 1,000 | 0.65 | +0.6 | −30.1 |
| 3 | Yes | 0.45 | 2,000 | 0.75 | +0.9 | −29.4 |
| 4 | Yes | 0.45 | 3,000 | 0.85 | +1.3 | −28.6 |
| 5 | Yes | 0.64 | 3,000 | 0.85 | +1.4 | −26.8 |
| 6 | Yes | 0.66 | 1,000 | 0.65 | +0.8 | −27.5 |
| 7 | Yes | 0.36 | 1,000 | 0.65 | 0 | −32.4 |
| 8 | Yes | 0.65 | 1,000 | 0.65 | +0.6 | −27.1 |
| 9 | Yes | 0.45 | 1,000 | 0.65 | +0.4 | −29.5 |
| Comp. 1 | No | — | — | — | — | — |
| Comp. 2 | No | 0.82 | 1,000 | 0.65 | +0.9 | −23.1 |
| Comp. 3 | No | 0.80 | 3,000 | 0.30 | −3.4 | −26.6 |
| Comp. 4 | Yes | 0.44 | 3,000 | 0.42 | −1.3 | −30.9 |
| Comp. 5 | Yes | 0.66 | 3,000 | 0.42 | −1.0 | −28.7 |
| Comp. 6 | Yes | 0.45 | 3,000 | 0.30 | −3.7 | −31.3 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate, an under coat layer consisting essentially of an electrically conductive material dispersed in a binder resin which is formed on at least one surface of the substrate, and a magnetic layer containing hexagonal system ferrite magnetic powder, in which a part of the iron atoms thereof are replaced with cobalt and titanium atoms, said powder being dispersed in a binder resin and having a thickness of not larger than 0.7 μm which is formed on the under coat layer.

2. The magnetic recording medium according to claim 1, wherein a weight ratio of the electrically conductive material to the binder resin in the under coat layer is from 85:15 to 10:90.

3. The magnetic recording medium according to claim 1, wherein the under coat layer has surface resistivity of $1 \times 10^8$ Ω or less.

4. The magnetic recording medium according to claim 1, wherein the under coat layer has a thickness of 0.1 to 3.0 μm.

5. The magnetic recording medium according to claim 1, wherein the magnetic layer further contains an aliphatic acid ester.

6. The magnetic recording medium according to claim 5, wherein the aliphatic acid ester is one selected from the group consisting of oleyl oleate, 2-ethylhexyl oleate, butyl stearate, octyl myristate, monoglyceride stearate, monoglyceride palmitate, monoglyceride oleate, pentaerythritol tetrastearate and mixtures thereof.

7. The magnetic recording medium according to claim 1, wherein the hexagonal system ferrite magnetic powder is one selected from the group consisting of barium ferrite magnetic powder, strontium ferrite magnetic powder, lead ferrite magnetic powder, calcium ferrite magnetic powder and these ferrite magnetic powder in which a part of iron atoms is replaced with a non-iron metal element.

* * * * *